June 13, 1939. H. D. ALSTON 2,162,210
PIPE CUTTER
Filed Dec. 28, 1936 2 Sheets-Sheet 1

Inventor
H. D. ALSTON.
Jesse R. Stone
Lester B. Clark
By
Attorney.

June 13, 1939.  H. D. ALSTON  2,162,210
PIPE CUTTER
Filed Dec. 28, 1936   2 Sheets-Sheet 2

Inventor
H. D. ALSTON.
Jesse R Stone
Lester B Clark
By
Attorneys.

Patented June 13, 1939

2,162,210

UNITED STATES PATENT OFFICE 2,162,210

PIPE CUTTER

Henry Ditts Alston, Livingston, Tex.

Application December 28, 1936, Serial No. 117,772

6 Claims. (Cl. 30—101)

The invention relates to a pipe cutter and particularly that type of cutter which is to be passed around a pipe which is in position in a pipe line.

The invention is adapted for use on buried pipe lines as well, regardless of whether the pipe resides in a horizontal or a vertical position.

It is one of the objects of the invention to provide a pipe cutter which will be uniformly centered upon the pipe being cut and in which both cutters and guides are adjustably carried by the device in order to execute a uniform cut.

Another object of the invention is to provide a pipe cutter frame which carries adjustable cutters and adjustable guides closely adjacent each other so that the depth of the cut being executed can be determined by the guide so that no one of the cutters will execute more than its predetermined portion of cut.

Another object of the invention is to provide a cutter assembly which is simple and economical and which has been found to be entirely satisfactory in the actual practice of cutting pipe.

Another object of the invention is to provide a beveling tool on a pipe cutter in combination with the cutter members and the guide members.

Other and further objects of the invention will be readily apparent when the following description is considered in connection with the accompanying drawings, wherein:

Fig. 1 is a side view of the device positioned about a pipe with certain parts of the housing broken away to illustrate the arrangement of the cutters, guides and beveling tool.

Figs. 2 and 3 are sections taken on the lines 2—2 and 3—3, respectively, to illustrate the cutter and the guide, respectively.

Figure 1:
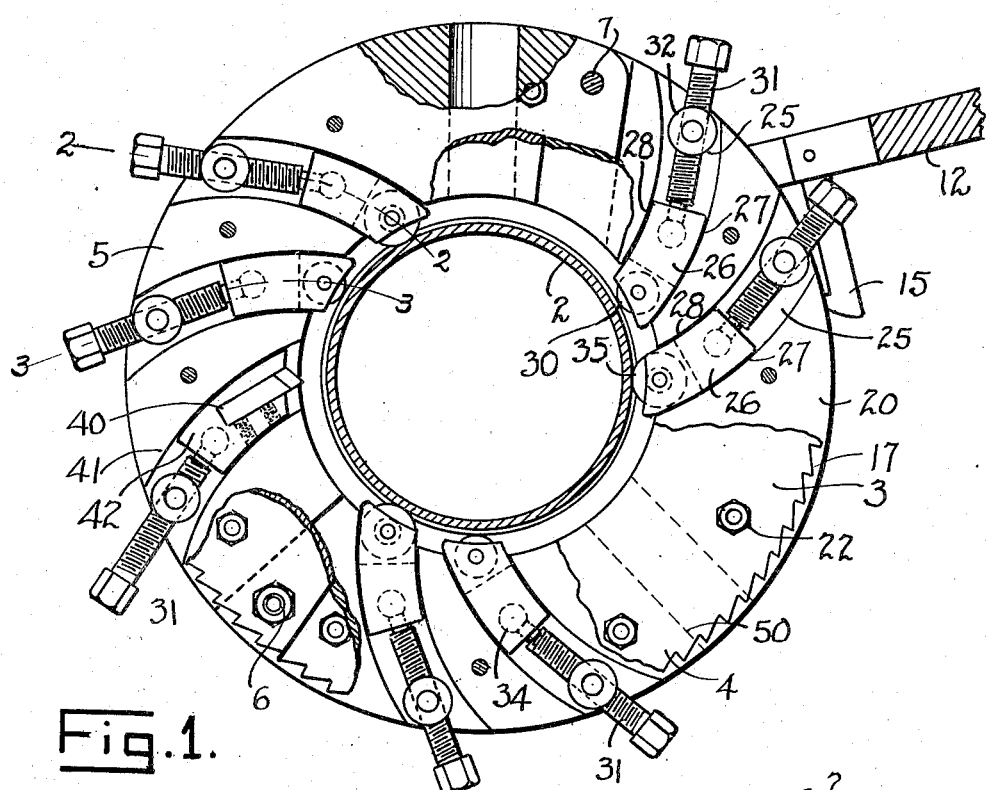
Figure 4:
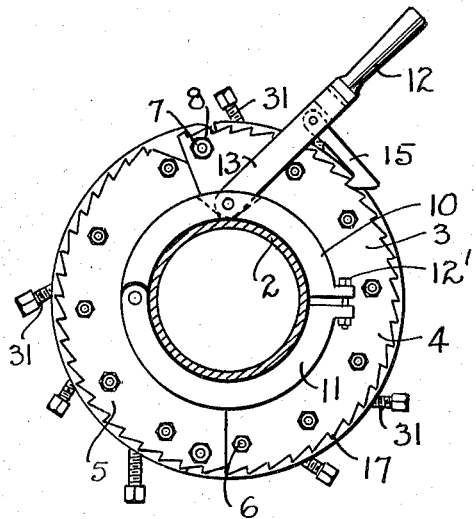
Fig. 4 is an end view of the device in position about the pipe and illustrating the ratchet arrangement for turning the cutter.
Figure 6:
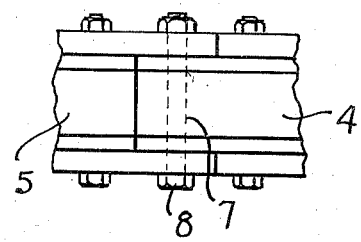
Fig. 6 is a broken detail view of the connection by which the parts are held in position about the pipe.
Figure 5:
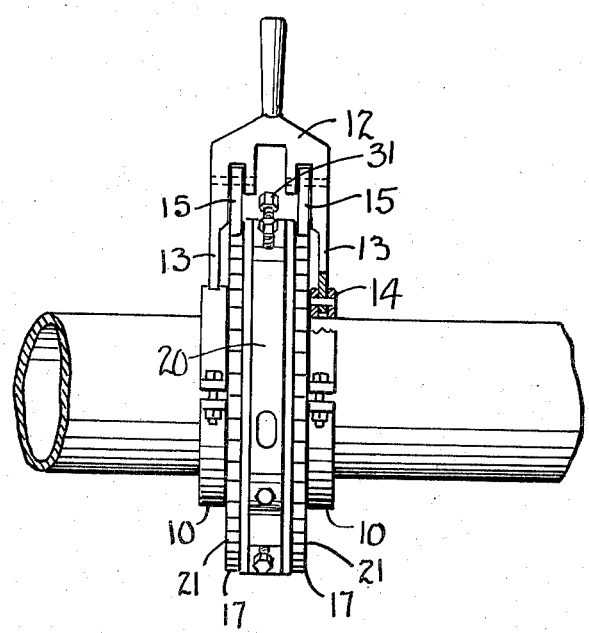
Fig. 5 is an edge elevation taken at right angles to Fig. 4 and showing the device about the pipe.
Figure 7:
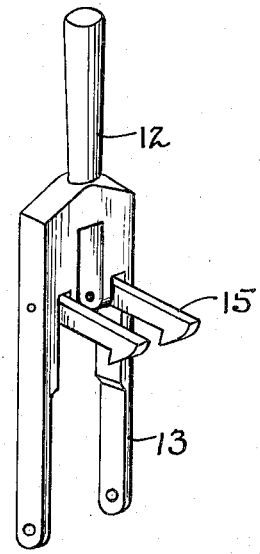
Fig. 7 is a detail view showing the handle and pawls used for turning the cutter.

The pipe cutter of the present invention is of the type which is to be passed around a pipe which is to be cut and thus rotated relative to the pipe in order to perform the cutting action. In Figs. 1 and 4 the pipe to be cut is shown at 2 and positioned about this pipe is the cutter in the form of a frame 3. This frame is in two sections 4 and 5, which are hinged at 7 by the bolt 8 and are latched together by the bolt 6. In this manner by removal of the bolt 6 the parts 4 and 5 may be moved apart and passed about the pipe. The bolt 6 can then be inserted and the frame will then be in the position shown in Fig. 1. In order to rotate the frame 3 a clamping device 10 is attached to the pipe and is in the form of two semi-circular portion 11 which are drawn together by a bolt 12' in order to anchor the clamp securely to the pipe. There are two such clamps 10 which are positioned on the pipe in spaced relation as shown in Fig. 5. Pivoted on these clamps is a handle 12 which is in the form of a yoke with two spaced legs 13. These legs are pivoted to the clamp 10.

Pivoted on the yoke 12 are the pawls 15, which are closely adjacent each of the legs 13 and arranged to shift downwardly by gravity. These pawls are so positioned that they will ride on the toothed trackways 17, one of which is positioned on each side of the frame 3. As seen in Fig. 4, as the handle 12 is moved to the right, the pawls 15 will ride over the teeth on the trackway 17 and when the handle is again moved to the left it will cause the frame 3 to move with it so that a step-by-step movement of the frame is executed.

The internal construction of the frame 3 is best seen in Fig. 1 where the frame is shown as being made up of a central body portion 20 which is in the form of an annulus. Spaced on opposite sides of this body portion 2 are the ring plates 21 and it is on these plates 21 that the trackways 17 have been formed. All of these parts are held together by the through-bolts 22.

Particular attention is directed to the slots 25, a plurality of which are formed in the body 20. It will be noted that these slots are of a curved configuration so that they incline away from the periphery of the pipe 2 and rearwardly therefrom in a counter-clockwise direction. Each of these slots is arranged to carry a block 26, each of which has a curved forward face 27 and a curved rearward face 28, so that the block is arranged for sliding movement in the slot 25 to and from the periphery of the pipe 2. It will be particularly noted that these slots 25 are arranged in pairs, and that in one of the slots of each pair the block 26 is provided with a roller guide 30. This guide is arranged to travel on the periphery of the pipe as seen in Fig. 3, and when the block 26 is properly adjusted by the adjusting screw of member 31 then the frame 3 will be adjusted the proper distance from the pipe 2 and by proper adjustment of all of the adjusting screws of the plurality of guide members the frame can be concentrically positioned about the pipe.

The adjusting member 31 is in the form of a threaded bolt which passes through a pivoted bushing 32, which bushing is in turn provided with end spindles 33 to be received in the end plates 21 on either side of the body 20. In this manner the adjusting screw 31 is capable of a tilting movement so as to follow the path of the block 26 and in order to permit suitable tilting of the block relative to the bolt member a T-slot 33' has been provided in the block and is arranged to receive the ball member 34 on the end of the adjusting member. This recess 33' extends laterally into the block so that the parts may be assembled and the plates 21 then arranged in position so that the member cannot thereafter move out of block 26.

Figures 2, 3:
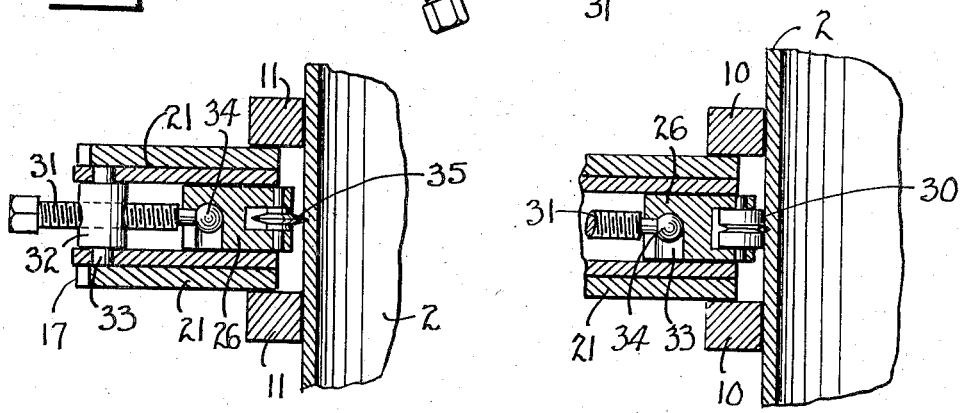

Each of the adjacent slots in each pair is arranged to carry a cutter member which is best seen in Fig. 2. The construction of this cutter is identically the same as the construction of the guide member except for the fact that a roller cutter 35 is carried by the block 26. The adjustment of this cutter is the same as the adjustment of the guide, and in Fig. 1 where the frame is shown as being rotatable in a counter-clockwise direction it will be observed that the guide member is preceding the cutter member so as to determine the amount of cut which is executed by each trip of the cutter member. The roller guide may or may not be grooved as seen in Fig. 3 and if desired the pawls 15 may be positioned to push instead of pull.

It seems obvious that when the handle 12 is manipulated by a step-by-step movement that the frame 3 will be caused to be rotated about the pipe, and by the adjustment of the screw members 31 the desired position of the frame relative to the pipe can be determined and the amount of cut which each cutter will negotiate is also determined by the adjustment of the bolt members 31 which are attached to the cutter blocks.

It would appear that this construction is simple and economical and can be readily adjusted so as to bring the frame concentrically about the pipe so that there will be a uniform cutting action and so that the cut may be negotiated in a minimum of time.

In many instances after the cut has been executed it is desirable to trim off the cut end of the pipe and to accomplish this a beveling tool 40 has been positioned in curved slot 41 and a bevel cutter block 42 has been mounted in the slot so that it can be operated the same as the guide of the cutters by means of an adjusting screw 31. The cutting edge of the beveling tool 40 serves to cut a clean edge on the end of the pipe so that it can be welded or otherwise handled very readily.

The body 20 is provided with a plurality of concentrically spaced sockets 50 which are arranged to receive a pair of levers by which the device may be rotated in event the handle 12 is incapable of exerting the sufficient torque on the frame to cause it to rotate.

Broadly, the invention contemplates an arrangement of the device so that the guide members will be positioned closely adjacent each of the cutters to prevent the cutter gouging into the pipe and to insure that the cutters are concentrically spaced about the pipe so that each cutter is negotiating its pro rata share of the cut.

What is claimed is:

1. A pipe cutter of the character described comprising a frame, means to clamp said frame about the pipe to be cut, a plurality of uniformly circumferentially spaced cutters carried thereby, a plurality of uniformly circumferentially spaced roller guide members alternated between said cutters, a block supporting each cutter and each guide, a curved slot in said frame for each block, and an adjustment screw pivotally supported in each slot and connected to each block so that said cutters and guide members may be uniformly adjusted so as to maintain said frame concentrically on the pipe to negotiate a concentric cutting of the pipe.

2. A pipe cutter of the character described comprising a frame, means to clamp said frame about the pipe to be cut, a plurality of uniformly circumferentially spaced cutters carried thereby, a plurality of uniformly circumferentially spaced roller guide members alternated between said cutters, a block supporting each cutter and each guide, a curved slot in said frame for each block, an adjustment screw pivotally supported in each slot and connected to each block so that said cutters and guide members may be uniformly adjusted so as to maintain said frame concentrically on the pipe to negotiate a concentric cutting of the pipe, and means to clamp said frame to the pipe to be cut.

3. A pipe cutter of the character described comprising a frame, means to clamp said frame about the pipe to be cut, a plurality of uniformly circumferentially spaced cutters carried thereby, a plurality of uniformly circumferentially spaced roller guide members alternated between said cutters, a block supporting each cutter and each guide, a curved slot in said frame for each block, an adjustment screw pivotally supported in each slot and connected to each block so that said cutters and guide members may be uniformly adjusted so as to maintain said frame concentrically on the pipe to negotiate a concentric cutting of the pipe, means to clamp said frame to the pipe to be cut, and ratchet means carried by said frame and said clamp so as to effect rotation of said frame relative to said clamp and the pipe.

4. A block for pipe cutters comprising a body having side faces lying in parallel planes and inner and outer concentric curved faces so that the block may be guided along the arc of a circle, a T-slot in the end of said body and having a side opening in one of the parallel faces, and a roller cutter mounted in the other end of the body.

5. A pipe cutter of the character described comprising a frame, means to clamp said frame about a pipe to be cut, a plurality of guide members and cutter members carried by the frame in alternate spaced relation, a block supporting each of said cutter and guide members, a curved slot in the frame for each block to guide said blocks along arcs intersecting at a common point at the center of the frame, and an adjusting screw pivotally supported in each slot and connected to the block in the slot to adjustably position the block therein.

6. A pipe cutter of the character described comprising a frame, means to clamp said frame about the pipe to be cut, a plurality of guide members and cutter members carried by said frame in alternate spaced relation, a block supporting each of said cutter and guide members, an inwardly directed slot in the frame for each of said blocks and an adjusting screw supported in each slot and connected to the block in the slot so that the cutter and guide members may be uniformly adjusted to effect concentric cutting of the pipe.

HENRY DITTS ALSTON.